United States Patent
Binsted et al.

(10) Patent No.: US 6,554,431 B1
(45) Date of Patent: Apr. 29, 2003

(54) METHOD AND APPARATUS FOR IMAGE PROJECTION, AND APPARATUS CONTROLLING IMAGE PROJECTION

(75) Inventors: Kim Binsted, Tokyo (JP); Franck Nielsen, Tokyo (JP); Claudio Pinhanez, Cambridge, MA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/762,734
(22) PCT Filed: Jun. 7, 1999
(86) PCT No.: PCT/JP00/03701
§ 371 (c)(1),
(2), (4) Date: Jun. 8, 2001
(87) PCT Pub. No.: WO00/77572
PCT Pub. Date: Dec. 21, 2000

(30) Foreign Application Priority Data

Jun. 10, 1999 (JP) .......................................... 11-164445

(51) Int. Cl.⁷ ..................... G03B 21/56; G03B 21/26; G03B 21/00; G03B 21/14
(52) U.S. Cl. ............................. 353/28; 353/69; 353/70; 359/446
(58) Field of Search ............................. 353/28, 69, 70, 353/122, 7, 10; 359/446, 447, 450, 451, 469, 470, 515, 516, 520, 528

(56) References Cited

U.S. PATENT DOCUMENTS

| | | | | |
|---|---|---|---|---|
| 3,053,144 A | * | 9/1962 | Harries et al. ................. | 353/7 |
| 4,232,334 A | * | 11/1980 | Dyson ......................... | 353/28 |
| 4,951,151 A | * | 8/1990 | Sorenson et al. ............. | 353/28 |
| 5,114,224 A | * | 5/1992 | Miyamoto et al. .......... | 353/122 |
| 5,870,136 A | * | 2/1999 | Fuchs et al. ................. | 348/169 |
| 5,883,476 A | * | 3/1999 | Noguchi et al. ....... | 315/368.12 |
| 6,416,186 B1 | * | 7/2002 | Nakamura .................... | 353/69 |

FOREIGN PATENT DOCUMENTS

| | | |
|---|---|---|
| JP | 58-31348 | 2/1983 |
| JP | 60-91342 | 5/1985 |
| JP | 8-211495 | 8/1996 |

* cited by examiner

*Primary Examiner*—Russell Adams
*Assistant Examiner*—Andrew Sever
(74) *Attorney, Agent, or Firm*—Bell, Boyd & Lloyd LLC (57) ABSTRACT

An image projection apparatus is provided. The image projection apparatus includes a camera which acts as an image pickup device. The camera detects the position of curved surface which serves as a target for displaying projected image. Thus, an image can be projected by the projection apparatus to a surface other than a fixed planar surface. Markers are placed on the curved surface, and a marker follower follows the markers based on an image pickup signal from the camera. An attitude and/or position prediction unit is provided for predicting the attitude and/or position of the curved surface. A computer is provided having an image creating unit for creating an image based on the attitude and/or position of the curved surface. Finally, a projector is provided for projecting an image from the computer to the curved surface as a target of the projection.

14 Claims, 7 Drawing Sheets

METHOD AND APPARATUS FOR IMAGE PROJECTION, AND APPARATUS CONTROLLING IMAGE PROJECTION

BACKGROUND OF THE INVENTION

1. Field of the Invention

The present invention relates to a method and apparatus for projecting an image on a three-dimensional curved surface as well as to an image projection control apparatus for controlling the image projection on a three-dimensional curved surface.

2. Description of the Prior Art

An image projection apparatus is known for projecting a still image on a fixed planar object, such as a so-called overhead projector. Also known is an image projection apparatus for projecting an image of a moving picture on a fixed planar object, such as a film projection device.

The conventional image projection apparatus is, thus, designed to project an image on the stationary planar object. Therefore, the conventional image projection device has found only limited application.

SUMMARY OF THE INVENTION

The present invention overcomes the above-mentioned deficiency, and is aimed at providing an image projection method and apparatus for projecting an image on an object other than a stationary planar object, and an image projection control apparatus for controlling the image projection.

For accomplishing the above object, the present invention provides an image projection apparatus for projecting an image on a moving three-dimensional curved surface, including a position detection portion for detecting the position of the cured surface, a projection portion for projecting an image on the curved surface, and a control portion for performing control to create an image to be projected on the curved surface to project the created image by the projection portion on the curved surface based on the position of the curved surface as detected by the position detection portion.

The present invention also provides an image projection method for projecting an image on a moving three-dimensional curved surface, including detecting a position of the curved surface, preparing an image to be projected on the curved surface and projecting the prepared image on the curved surface based on the position of the detected curved surface.

The present invention further provides an image projection control apparatus for controlling the projection of an image for the moving three-dimensional curved surface, wherein control is performed so that an image to be projected on the curved surface will be created based on the position of the inputted curved surface and so that the created image will be projected on the curved surface.

DETAIL DESCRIPTION OF THE PREFERRED EMBODIMENTS

Figure 1:
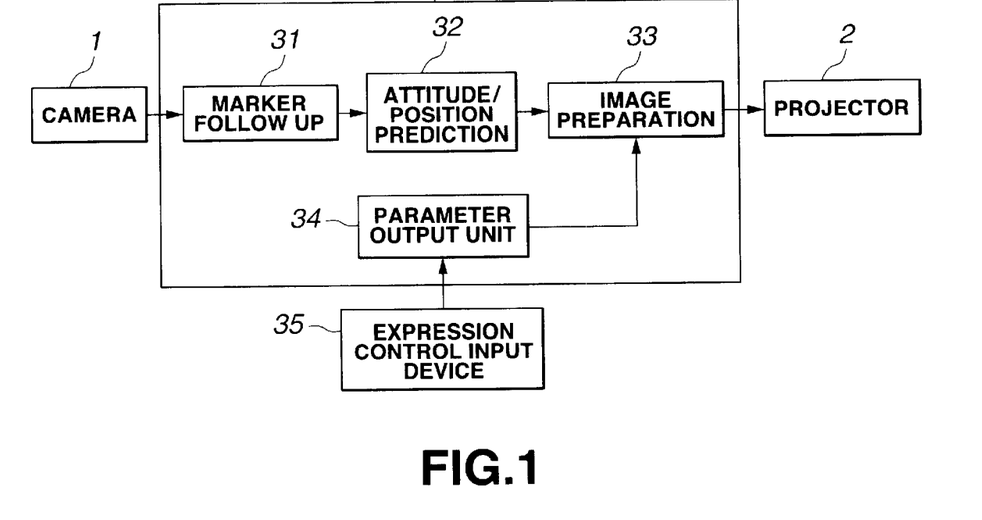
FIG. 1 a block diagram showing a schematic structure of an image projection apparatus.

The image projection apparatus according to the present invention includes a camera 1, used as an image pickup device for detecting the position and orientation of a curved surface of an object on which an image is to be projected, a computer 3 for processing an image being projected based on image pickup signals from the camera 1, and a projector 2 for projecting the image from the computer 3 on the curved surface under consideration.

Figure 2:
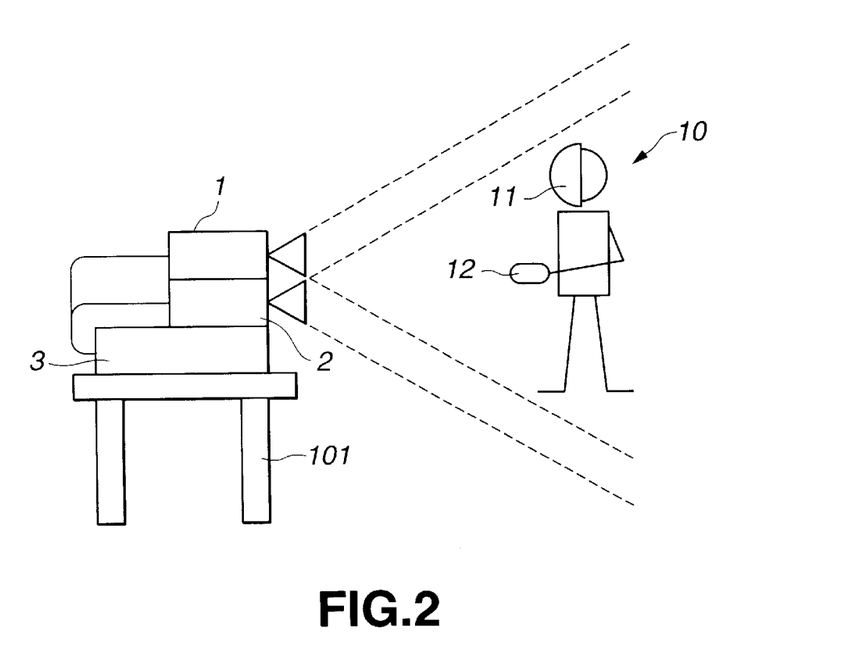
FIG. 2 shows an example of the using state of the image projection apparatus.

The image projection apparatus of the present embodiment is used for a configuration shown, for example, in FIG. 2. In the present embodiment, the curved surface, as an object for image projection, is assumed to be a mask 11 worn by a person 10. Although the mask 11 is preferably white in color to display an image formed by the projector 2, it is not limitative. There is shown in the drawing an image projection apparatus, made up of the camera 1, projector 2 and the computer 3 on a desk 101, at a pre-set distance from the person 10 under consideration.

In the image projection apparatus, the camera 1 images the mask 11 set on the head of the person 10 to output image signals. The computer 2 detects the attitude or the position of the mask 11 from the image signals from the camera 1 to prepare an image of a face from the image signals of the camera 1. The projector 2 projects an image of the face prepared by the computer 3 on the mask 11. The person 11 is able to control the expressions of the image of the face projected on the mask by an expression control signal input device 12.

Although a device such as a remote controller is drawn on the expression control signal input device 12, the expression control signal input device 12 can, of course, be directly connected to the computer 3. As this expression control signal input device 12, a keyboard, for example, may be employed.

The camera 1, constituting the image projection apparatus of FIG. 1, detects an image incident from the mask 11 as a three-dimensional curved surface by a two-dimensional image frame. The camera 1 may, for example, be a so-called CCD image pickup device, formed of a two-dimensional array of plural charge-coupled devices (CCDs) as image pickup elements. The camera 1 outputs image signals of, for example, the NTSC (National Television System Committee) system.

The computer 3 is made up of a marker follower 31 for detecting the positions of markers on the mask 11 to pursue the mask 11, an attitude and/or position prediction unit 32 for predicting the attitude and/or position such as the direction or the position of the mask 11, an image preparing unit 33 for preparing an image based on the attitude and/or the position predicted by the attitude and/or position prediction unit 32 and a parameter outputting unit 34 for outputting parameters to the image preparing unit 33 responsive to control signals sent from the expression control signal input device 12.

As the computer 3, a so-called personal computer may, for example, be employed. In this case, the marker follower 31, attitude and/or position prediction unit 32, image preparing unit 33 and the parameter outputting unit 34 are effected as functional blocks of a program executed on the computer 3.

The projector 2 forms an image from the computer 1 on the mask 11 as the three-dimensional curved surface. As the projector 2, a so-called video projector, not having a cathode ray tube nor an objective lens, may, for example, be employed.

The expression control signal input device 12 is fed with a control signal controlling the expression of a face projected on the mask by the user, and transmits the input signal to the computer 3. The expression control signal input device 12 modulates the input control signal with, for example IR rays to transmit the modulated control signal to the computer 3.

A specified embodiment of the above-described image projection apparatus, incorporated in a so-called distributed processing system having a number of computers interconnected over a network, is explained with reference to FIG. 3. For simplicity, the parts of the present specified embodiment corresponding to those of the image projection apparatus shown in FIG. 1 are depicted by the same reference numerals.

Figure 3:
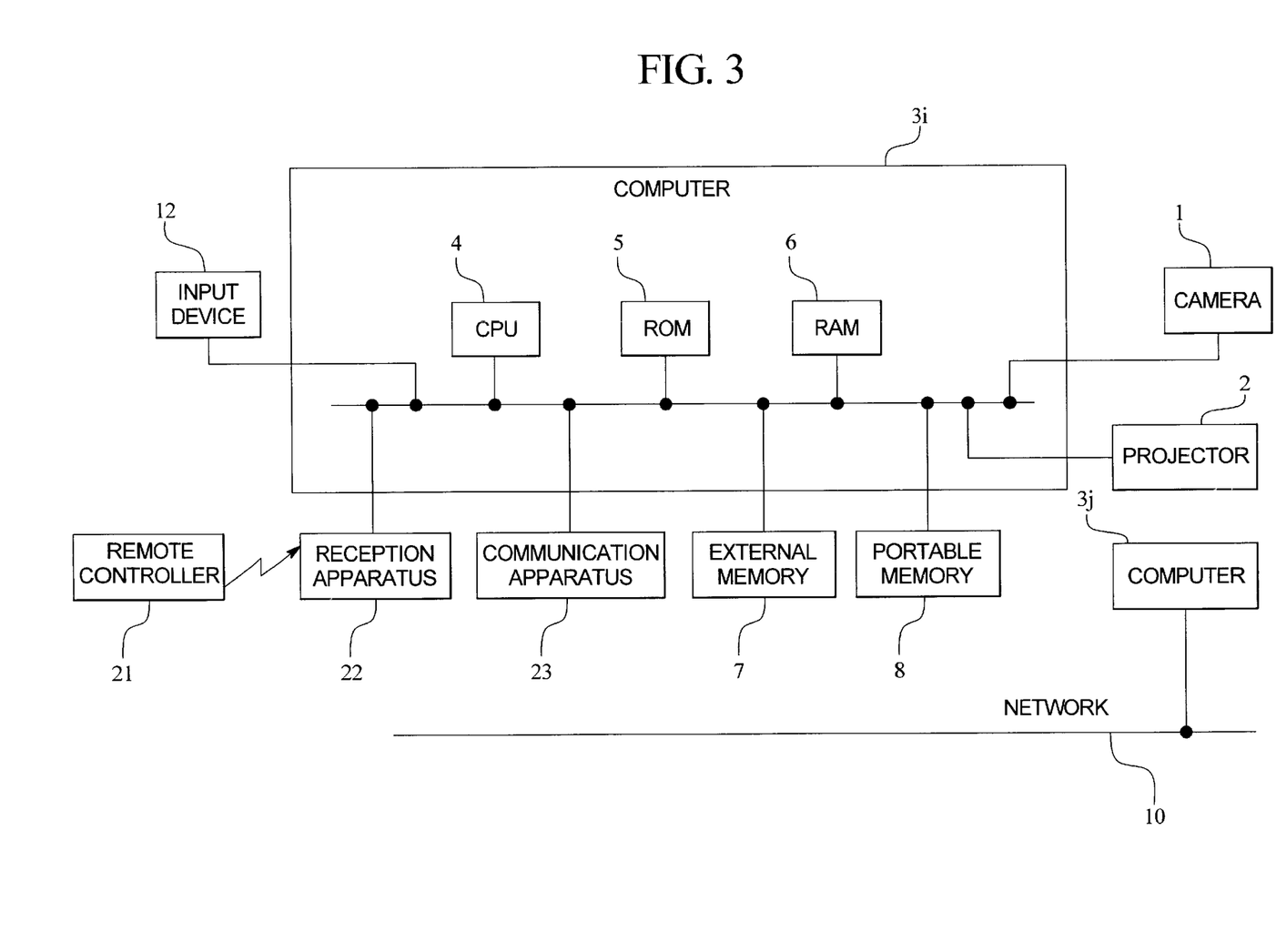
FIG. 3 is a lock diagram showing a specified example of the image projection apparatus.

This distributed processing system is partially shown in FIG. 3, in which an ith computer 3i and a jth computer 3j are connected to the network 10.

The network 10 may, for example, be a LAN (Local Area Network) and, more specifically, may be the so-called Ethernet.

Of the computers connected to the network 10, the ith computer 3i is employed as an image projection apparatus. This ith computer 3i includes a CPU 4, a ROM 5 and a RAM 6. As the computer 3i, a so-called stand-alone personal computer may be used.

The ith computer, used as the image projection apparatus, is connected to the network over a communication device 23, while being connected to the camera 1, projector 2, an input device 12 and a reception device 22.

The communication device 23 adjusts data transmission/reception between the ith computer 3i and the network 10. As this communication device 23, a network interfacing device, for example, is used. For example, if the so-called Ethernet is used as the network 10, a so-called Ethernet controller is used as the communication device 23.

As the input device 12, a keyboard, for example, is used, and data is inputted by the user to the ith computer 3i.

The reception device 22 receives a signal sent from a remote controller 21 to send the received signal to the ith computer 3i. The reception device 22 includes a photodetector for detecting a signal sent from the remote controller 21 by IR rays and demodulates the signal detected by this photodetector to send the demodulated signal to the ith computer 3i. This reception device 22 may, for example, be a parallel interfacing device.

To the ith computer 3i are connected an external storage device 7, such as a hard disc drive, and a portable storage device 8, such as a so-called CD-ROM drive.

The external storage device 8 is a large-capacity storage device and stores image data photographed, for example by the camera 1. The portable storage device 8 stores data in the portable medium. In the portable medium, there is stored a control program necessary to utilize the ith computer 3i as an image projection apparatus.

If the ith computer 3i is used as the image projection apparatus, a control program for controlling the ith computer 3i as the image projection apparatus is read into the RAM 6. The CPU 4 executes this control program to cause the operation of th ith computer 3i as the image projection apparatus.

In the ith computer 3i, the marker follower 31, attitude and/or position prediction unit 32, image preparing unit 33 and the parameter outputting unit 34 correspond to the functional blocks of the control program executed by the CPU 4.

Also, in the ith computer 3i, the expression control signal input device 12 in the image projection apparatus shown in FIG. 1 is effected as the remote controller 21 or by the input device 12. That is, in the ith computer 3i, the control signal for controlling the expression is remote-inputted by the remote controller 21 or inputted to the input device 12 such as a keyboard connected to the ith computer 3i.

In the present specified embodiment, the processing pertinent to the image projection such as image creation is executed by the ith computer 3i to which are connected the camera 1 and the projector 2. However, this processing need not necessarily be executed by the ith computer 3i to which are connected the camera 1 and the projector 2. For example, this processing may be executed by the jth computer 3j connected to the ith computer 3i over the network 10.

From the projector 2 of the image projection apparatus, an image is projected to the mask 11 worn by the person 10. The person wearing the mask 11 moves freely so that the position of the mask 11 also is moved. Thus, the processing for detecting the moving mask 11 is required. The processing of detecting the mask 11 in the computer 3 of the image projection apparatus is hereinafter explained.

Figure 4:
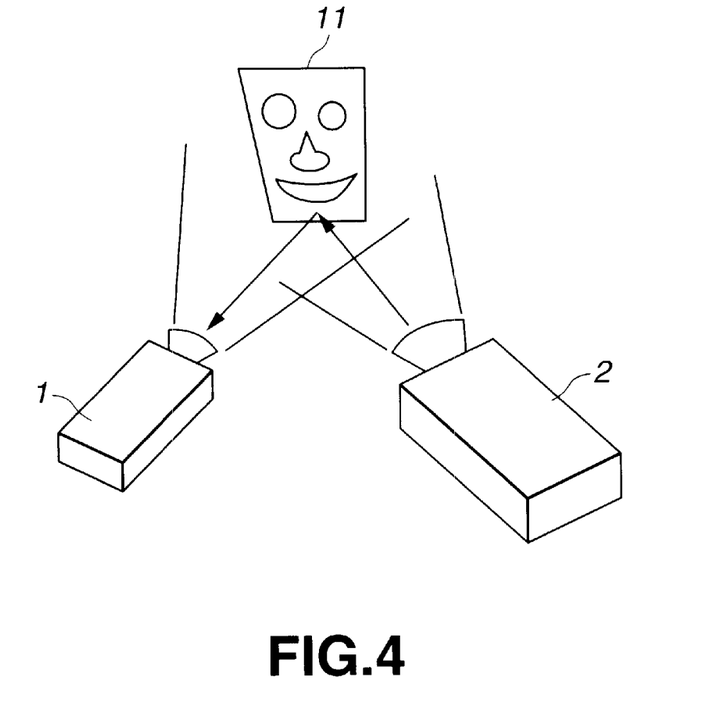
FIG. 4 shows the state of image projection on a mask by the image projection apparatus.

The computer 3 detects the position of the mask 11 from the image thereof photographed by the camera 1, prepares the image based on the position by the computer 3 and projects the image formed by the projector 2 on the mask 11 at this position, as shown in FIG. 4.

As a method for pursuing the position of the mask 11, the marker position is detected, in the present embodiment, in place of using the algorithm for detecting characteristic points extremely sensitive to the continuity of the digitizing process and the noise. As the marker, an infrared LED is used. An IR paint or physical markers may also be used as a marker.

Figure 5:
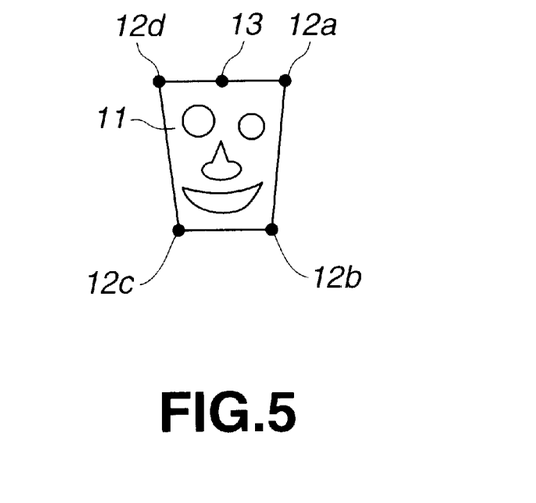
FIG. 5 shows markers fitted on a mask.

To this end, first to fifth markers 12a, 12b, 12c, 12d and 13, by LEDs (light emitting diodes), are mounted on the mask 11 of FIG. 4, for detecting the mask position, as shown in FIG. 5. These first to fifth markers 12a, 12b, 12c, 12d and 13 are mounted so as not to overlap with one another by usual bodily movements of the user 10 wearing the mask 11, such as movement of swinging his or her head. The marker follower 31 of the computer 3 pursues the first to fifth markers 12a, 12b, 12c, 12d and 13 to detect the position of the mask 11.

The first to fifth markers 12a, 12b, 12c, 12d and 13 can readily be recognized in the photographed image by mounting an IR filter eliminating light rays other than the IR rays on the camera 11. Since the mask 11 is moving, the first to fifth markers 12a, 12b, 12c, 12d and 13 appear as a cluster (aggregated mass) of pixels in the image photographed by the camera 1 carrying the IR filter.

The marker follower 31 first detects the cluster of pixels (set of pixels) associated with the first to fifth markers 12a, 12b, 12c, 12d and 13. The marker follower 31 detects a "source point", which proves a center point of the pixel cluster, for each pixel cluster. The marker follower 31 detects the source points in real-time. A label is affixed to each source point.

The marker follower 31 detects the position of the mask 11 by adapting the source points, detected as described above, ultimately to a known pattern. Since the mask rotates freely, a label indicating each source point is affixed to each source point in order to discriminate the source points, changed in their positions or orientation by rotation, from one another. The pattern is selected so as not to be ambiguous to permit facilitated labelling of the respective source points, and is stored in a storage device.

On the square-shaped mask 11, shown in FIG. 5, the first to fifth markers 12a, 12b, 12c, 12d and 13 are attached to the right end of an upper side of the face, at the right end of the lower side of the face, opposite to the upper side, at the left end of the lower side, at the right end of the upper side and at a mid point of the upper side of the face, respectively.

As will be described later, four markers, that is, the first marker 12a, the second marker 12b, the third marker 12c and the fourth marker 12d are sufficient to detect the position in the three-dimensional space of the mask 11.

The fifth marker 13 is arranged on a collinear point lying on the same straight line as that of the first and fourth markers 12a, 12d, and hence eliminates ambiguity in labelling. That is, this fifth marker 13 lies on a straight line interconnecting the first and fourth markers 12a, 12d and is disposed therebetween to facilitate its discrimination.

The attitude and/or position prediction unit 32 predicts the attitude and the position of the mask 11 based on the position of the mask 11 as detected by the marker follower 31. This attitude and/or position prediction unit 32 reduces the "shift effect" caused by movement of the mask 11.

By the shift effect is meant such an effect in which, since the image pickup by the camera 1 occurs at discrete time points, the image prepared on the basis of the image c(t) photographed at time point t is projected at time t+$\ddot{A}$t, however, the mask position at time point t differs from the mask position at time point t+$\ddot{A}$t, with the result that the image projected from the projector 2 is deviated with respect to the mask 11.

Thus, there is produced an error in the position of the mask 11 detected by the marker follower 31 and the position of the projected image produced in association with the position of the mask 11.

Figure 8:
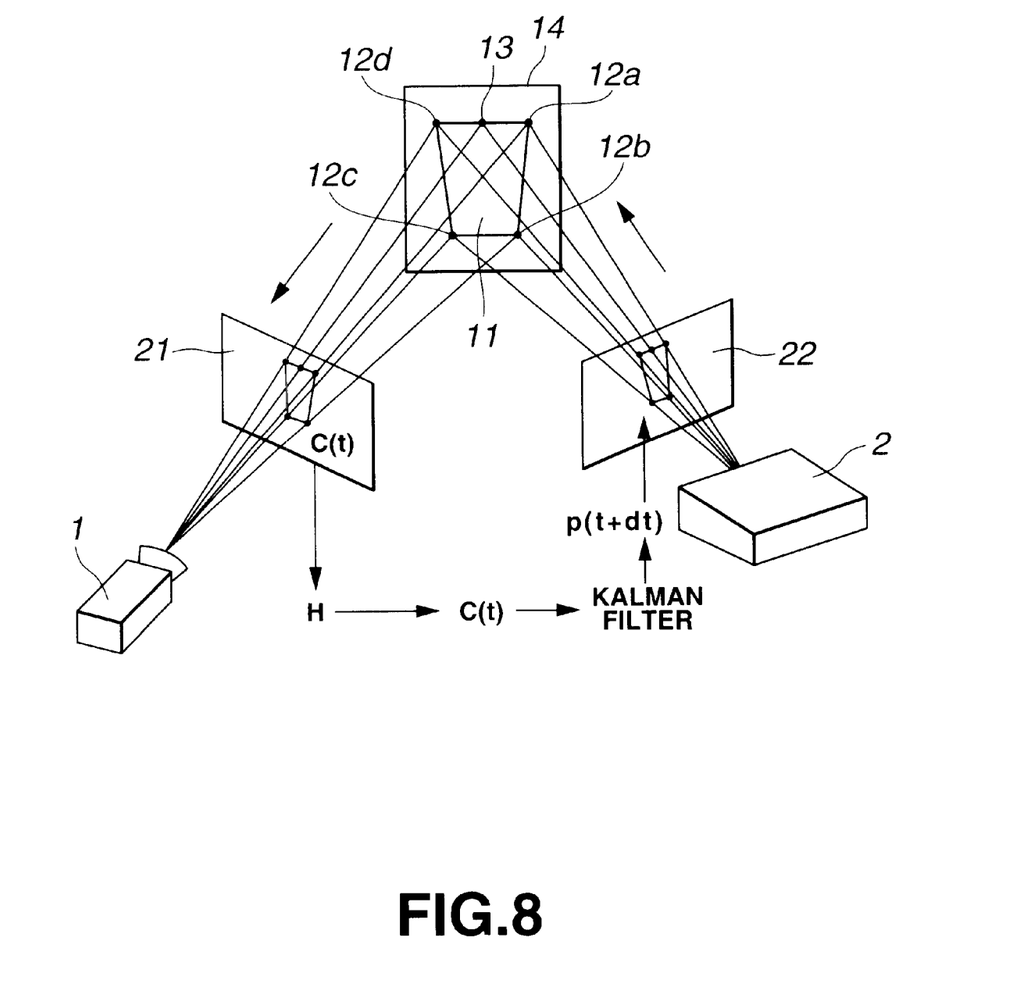
FIG. 8 illustrates the use of a Kalman filter in the image projection apparatus.

The noise elimination processing is carried out in connection with the prediction of the attitude and/or position performing by the attitude and/or position prediction unit 32. For this noise elimination, a noise filter is used.

For this noise filter, a Kalman filter is used, which is an optimum filter derived from the root mean square (rms) standard.

The Kalman filter optimally uses non-accurate data in a linear or substantially linear system having a Gaussian error to continuously update the optimum evaluation of the current state of the system. For a non-linear system, an extended Kalman filter is used. In the present invention, the latter is used in view of the problem to be solved.

Based on the results of the attitude and/or position prediction as detected by the attitude and/or position prediction unit 32, the image preparing unit 33 of the image projection apparatus prepares an image of a face to be projected on the mask 11. The position of the projected image, required for this purpose, is calculated using the homography. This will be explained substantially in detail in connection with calibration.

The image of the mask projected on the mask 11 presenting a three-dimensional curved surface needs to be prepared more meticulously than the image projected on the two-dimensional plane. It is because a surface which should be hidden in the virtual theoretical mask should not appear on the physical virtual mask. To this end, it is necessary to find the three-dimensional coordinates of the mask 11 so that the hidden surface will not be projected on the mask 11. The picture quality is improved by routine techniques such as splatting or deghosting.

The image preparing unit 33 prepares an image of a face taking the feeling expression, mouth movement synchronization to the speech, expression and character into account. This improves the expression capabilities of an actor as a user wearing the mask 11. The image preparing unit 33 varies the image of the face projected on the mask 11, time lapse or the reaction of the spectator viewing the image projected on the mask 11.

In the image of the face formed for projecting the mask 11, the mouth opening/closure is synchronized in its movement with the speech enunciation by the user. The mouth movement is made by predicting the mouth movement based on the speech enunciation by the user. Specifically, mouth movement is predicted based on the vowel by exploiting the fact that the vowel in general is articulated with a larger mouth movement. This prediction of the mouth movement is by the neural network which has learned the relation between the vowel and the mouth movement. This technique is disclosed in, for example, in Shiego Morishima, Fumio Kawakami, Hiroshi Yamada and Hiroshi Harashima, A Modelling of Facial Expression and Emotion for Recognition and Synthesis, and In proceedings of the Sixth International Conference on Human-Computer Interaction, volume I. Human and Future Computing of 1.8 Nonverbal Communication, pages 251 to 256, 1997.

The image preparing unit 33 is fed with a control signal from the expression control input device actuated by the user. The image preparing unit 33 is responsive to parameters inputted by the parameter outputting unit 34 to vary the image of the face to be produced. For example, if the actor as a user wearing the mask 11 is performing a play, the expression of the image of the face projected on the mask 11 can be varied responsive to the performance by the input to the expression control signal input device 12. For example, the actor is able to vary the expression of a face projected on the mask 11, responsive to the dialog the actor has with the spectator.

The parameter outputting unit 34 of the image projection apparatus receives a control signal controlling the expression of the image of the face sent from the expression control signal input device 12 to output the received contents as parameters to the image preparing unit 33. The image preparing unit demodulates the control signal sent from the expression control signal input device 12 by IR communication to output the demodulated control signal as pre-set parameters, Referring to FIG. 6, calibration of the relative position between the camera photographing an image of the mask 11 as a three-dimensional curved surface and the projector 2 projecting an image to the mask 11 is explained with reference to FIG. 6.

Figure 6:
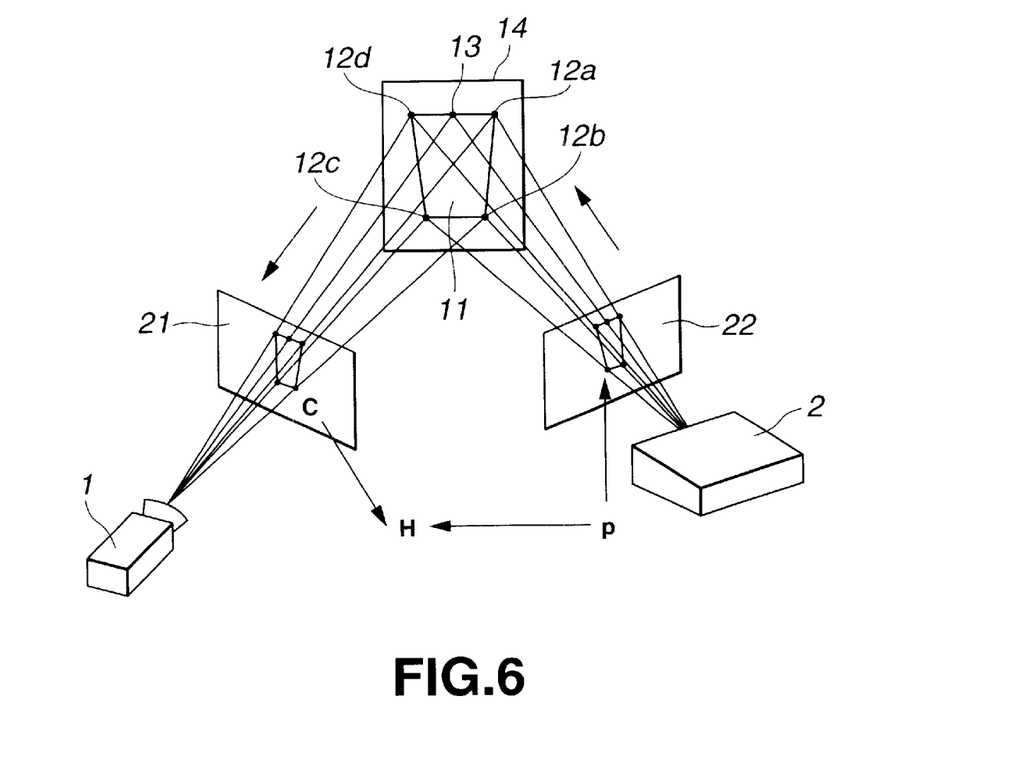
FIG. 6 illustrates calibration of the image projection apparatus.

Taking into account the fact that the projector 2 can be deemed to be a camera 1 having the opposite light propagating direction, the relative positions of the points observed from the camera 1 and the projector 2 are equivalent insofar as the camera 1 and the projector 2 are concerned.

Therefore, the relation between the camera 1 and the projector 2 may be handled as a geometrical problem by homography or collinearity.

The homography or collinearity defines the linear relation which preserves the incidence relation and straightness of lines in the projective space and may be represented as a 3-row 3-column matrix.

In the present embodiment, the geometrical relative positions between the camera 1 and the projector 2 is negatively calibrated without directly calculating the intrinsic and extrinsic parameters in their entirety. This evades occurrence of voluminous computations or errors undesirably produced when directly computing the parameters.

In calibration of the relative positions, in a static case, projections of four points in the three-dimensional space need to be coincident in the image photographed by the camera 1 and in the image projected from the projector 2. If there are more than four corresponding point pairs between the image photographed by the camera 1 and the image projected from the projector 2, it is possible to adapt the homography by the least squares of the corresponding points.

The relation of homography means that a point $p_1$ of an image of the projector 2 corresponds to a point $p_2$ of the image of the camera 1 in accordance with the following equation:

$$p_2 = \begin{bmatrix} x_2 \\ y_2 \\ z_2 \end{bmatrix} = HP_1 = \begin{bmatrix} h_{11} & h_{12} & h_{13} \\ h_{21} & h_{22} & h_{23} \\ h_{31} & h_{32} & h_{33} \end{bmatrix} \begin{bmatrix} x_1 \\ y_1 \\ z_1 \end{bmatrix}$$

According to homogeneous coordinates, $$p_1 \sim (x_1/z_1, y_1/z_1)$$

and $$p_2 \sim (x_2/z_2, y_2/z_2)$$

In actuality, calibration of the relative positions means that a known fixed pattern projected on the mask 11 needs to be brought into coincidence with the corresponding real pattern drawn on the mask 11 by a manual operation.

For example, in the image projection apparatus, the position of a screen 14 relative to the camera 1 and the projector 2 is adjusted with the first to fifth markers 12a, 12b, 12c, 12d and 13, mounted on the screen 14, shown in FIG. 5, corresponding to the mask 11, as a reference pattern. The sequence of the calibration is now explained with reference to FIG. 7.

Figure 7:
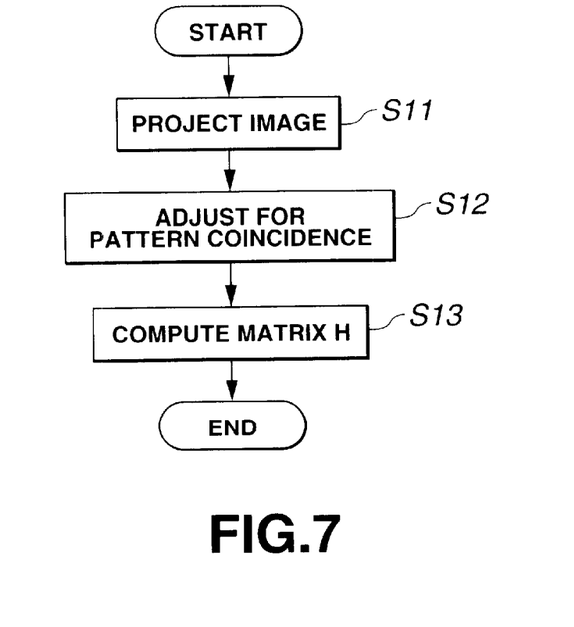
FIG. 7 shows a flowchart illustrating the operation of the image projection apparatus.

At the first step S11, the projector 2 projects first to fifth source points, making up a reference pattern, associated with the first to fifth markers 12a, 12b, 12c, 12d and 13 on the mask 11, respectively, on the screen 14.

At step S12, the projector 2 is adjusted as to the position of the screen 14 corresponding to the mask 11 so that the first to fifth source points will be in register with the positions of the first to fifth markers 12a, 12b, 12c, 12d and 13 of the mask 11 as drawn on the screen 14.

Although the screen 14, that is the mask 11, is here moved to bring the source points into coincidence with the markers, the projector 2 may be moved, with the screen 14, that is the mask 11, remaining fixed, or both the projector and the screen 14, that is the mask 11, may be moved.

This adjustment is performed by the user by visual inspection so that the first to fifth source points will overlap with the first to fifth markers 12a, 12b, 12c, 12d and 13 on the screen 14 (mask 11). If the user has confirmed that the first to fifth source points are in register with the first to fifth markers 12a, 12b, 12c, 12d and 13 on the mask 11, he or she pushes a "calibration button" provided on the image projection apparatus to input the effect that the relative position calibration has been completed. Meanwhile, the "calibration button" may be implemented by an input key of a keyboard, if so desired.

If the position of the screen 14 has been adjusted, homography is established between the points c corresponding to the first to fifth markers 12a, 12b, 12c, 12d and 13 photographed by the camera 1 and the points p corresponding to the first to fifth source points projected from the projector 2. That is, a matrix H representing the homography of three rows and three columns is calculated. The calculated matrix is referred to subsequently and hence is saved in a memory in the computer 3.

The points c photographed by the camera 1 and the points p projected by the projector 2 are given as positions of the projections in a first frame 21 and in a second frame 22, respectively. In the first frame 21 and in the second frame 22, the points c and p are expressed as the positions in image elements of the camera 1 or the projector 2.

Once the calibration operation has come to a close, the image projection apparatus can use the geometrical relation of correspondence between the image of the mask 11 photographed by the camera 1 and the image of the mask projected by the projector 2. That is, the image projection apparatus is able to prepare an image based on the position of the screen 14 (mask 11) photographed by the camera 1 to project the so-prepared image at a position in register with the screen 14 (mask 11).

Figure 9:
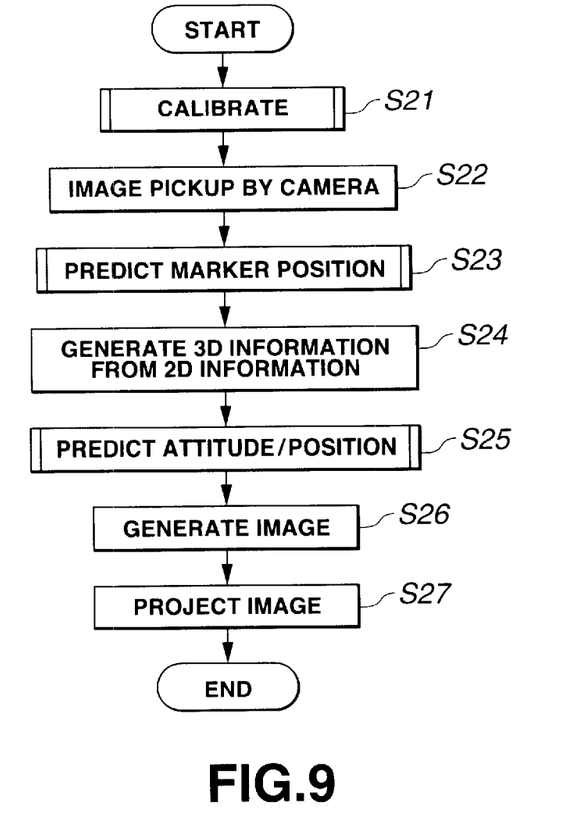
FIG. 9 is a flowchart showing a step of image projection of the image projection apparatus.

Next, the operation of the image projection apparatus is explained by referring to FIG. 9. In the image projection apparatus, image projection actually occurs on the mask 11 which is a moving curved surface. Here, for comparison to the calibration operation shown with reference to FIG. 6, the same screen as that used for calibration is used.

At the first step S21, the relative positions between the camera 1, photographing the image of the mask 11 as a three-dimensional curved surface, and the projector 2, projecting the image to the mask 11, are calibrated. In this step S21, the above-described calibration is executed.

At step S22, the camera 1 photographs an image including the first to fifth markers 12a, 12b, 12c, 12d and 13 of the screen 14 (mask 11).

Figure 10:
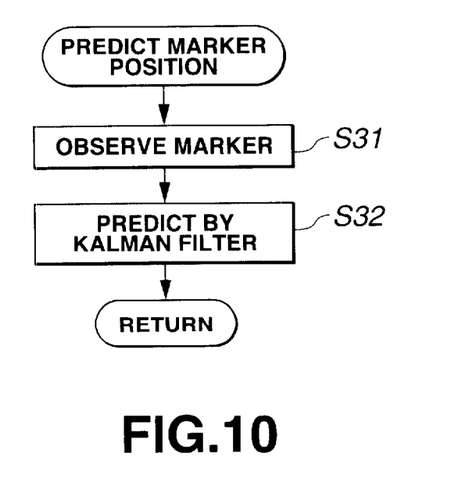
FIG.10 shows a flowchart for illustrating the step of predicting a marker position.

At step S23, the marker follower 31 of the computer 3 predicts the marker positions. That is, the marker follower 31 observes and detects the positions of the points c(t) corresponding to the first to fifth markers 12a, 12b, 12c, 12d and 13 on the screen 14 (mask 11), as shown in FIG. 10. This is carried out by detecting a center source point from a pixel cluster representing the point c(t).

The observed values c~(t) of the points c(t), thus detected, are converted into observed values p~(t), corresponding to the projector 2, by the matrix H representing the homography as discussed above. The observed values p~(t) of the points p(t9 are corrupted by errors. It is noted that the symbol "~" indicates that the value is the observed value.

By the above-described matrix H of the homography, the points p(t) corresponding to the first to fifth markers 12a, 12b, 12c, 12d and 13 projected by the projector 2 correspond to the points c(t) corresponding in turn to the first to fifth markers 12a, 12b, 12c, 12d and 13 photographed by the camera 1 at the time point t. The above-mentioned conversion is based on this relation of correspondence.

At step S32, the noise is removed by calculations by the two-dimensional Kalman filter, based on the observed value p~(t) of the points p(t) obtained at step S31, so that the predicted value p (t+1) at a time point t+1 advanced by one cycle is predicted based on the observed value p~(t). Specifically, the time is advanced by 1 in order to cope with the image creation at step S26 and with image projection at step S27 as will be explained subsequently. After this step S32, processing reverts to step S23.

The calculations by the two-dimensional Kalman filter at this step S32 give a noise-free value $m_i(t)$ by processing the observed values $m\sim_i(t)$, representing the positions of points in the two-dimensional plane, where i=1, 2, . . . ,5, with a two-dimensional Kalman filter. It is noted that the observed values $m\sim_i(t)$ correspond to p~(t), whilst the noise-free value corresponds to p(t).

At step S24, the attitude and/or position prediction unit 32 of the computer 3 prepares the three-dimensional information from the two-dimensional information, based on the predicted value p(t+1) at time point t+1.

As described above, four or more points are required in order to find the position in a three-dimensional space from a position in a two-dimensional space forwarded from the camera 1. In the present embodiment, since the five points, namely the first to fifth markers 12a, 12b, 12c, 12d and 13, are provided on the screen 14 (mask 11), the position in the three-dimensional space can be found for the positions thereof in the two-dimensional plane.

Although the points p(t) corresponding to the projector 2, as converted by homography from the points c(t) photographed by the camera 1 are processed here, the similar processing may be used for preparing the three-dimensional information from the two-dimensional information.

At step S25, the attitude and/or position prediction unit 32 of the computer 3 predicts the attitude and position of the mask 11 based on the three-dimensional information as found at step S24.

Figure 11:
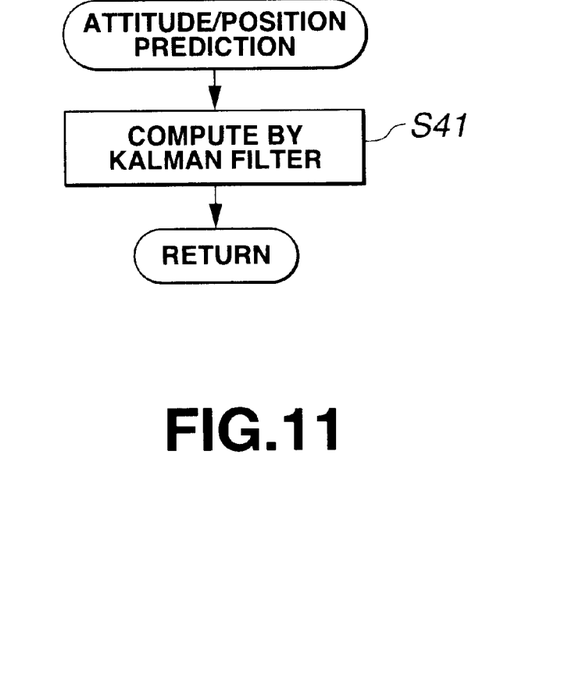
FIG. 11 shows a flowchart for illustrating the step of predicting an attitude and/or a position.

That is, the attitude and/or position prediction unit 32 at step S41 predicts the attitude and the position by the Kalman filter, using (T~, R~) of the mask 11 obtained based on the three-dimensional information from step S24, as shown in FIG. 11. It is noted that T~ and R~ denote transform vector and rotation matrix, respectively, and represent the coordinate system indicating the attitude and/or position of the mask 11 with respect to the reference coordinate system by transform and rotation, respectively.

At step S41, prediction values (T, R) indicating the attitude and/or position of the mask are obtained by calculations of the three-dimensional Kalman filter. After the processing at this step S41, processing reverts to step S25.

At step S26, the image preparing unit 33 of the computer 3 prepares an image based on the positions of the points p(t+1) corresponding to the first to fifth markers 12a, 12b, 12c, 12d and 13 predicted by the attitude and/or position prediction unit 32.

At step S27, the projector 2 projects the image prepared at step S26 on the screen 14.

By the above-described sequence of steps, the image created responsive to the predicted attitude and/or position of the mask 11, as a moving curved surface, on this mask 11.

Figure 12:
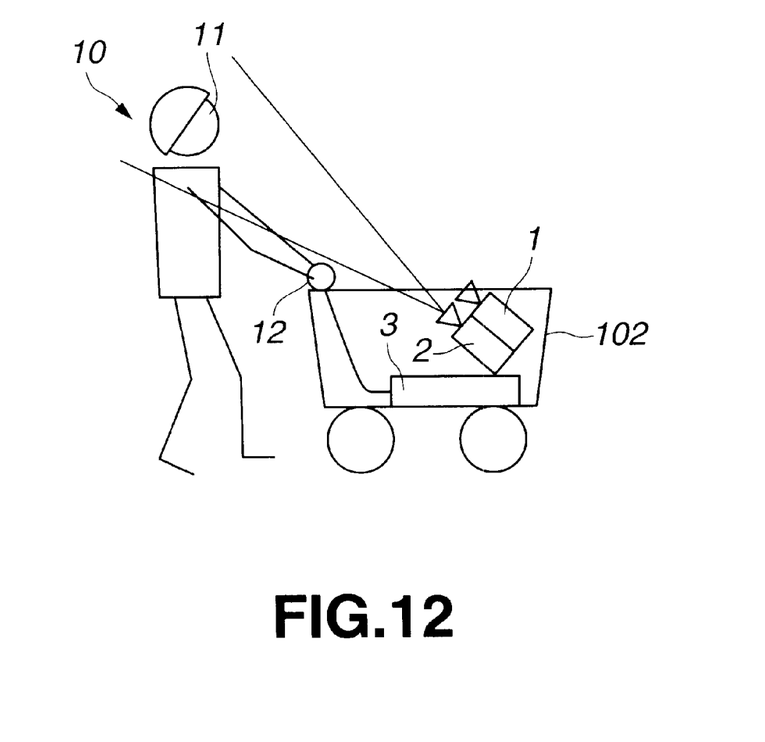
FIG. 12 shows another embodiment of the image projection apparatus of the present invention.

Referring to FIG. 12, a modification of the present invention is explained. This modification causes movement of the image projection apparatus.

In this modification, the image projection apparatus is arranged within a hand-driven cart 102. An image projection apparatus, arranged within the hand-driven cart 102, includes a camera 1, a projector 2, a computer 3 and an expression control signal input device 12. Meanwhile, parts or components constituting the image projection apparatus are similar to those of the previous embodiment and hence are not explained specifically.

The hand-driven cart 102 is moved by a user 10 thrusting its one end. The camera 1 and the projector 2, arranged in the inside of the hand-driven cart 102, have the image-pickup direction and the projection direction oriented towards the head of the user 10 wearing the mask 11. The image projected from the projector 2 is directed to the mask 11 of the user 10 so that the mask 11 is imaged by the camera 1. On the mask 11 of the user 10 is projected an image of the face expression.

On a handle of the hand-driven cart 102, acted on by the user 10, there is provided the expression control signal input device 12 fed with a control signal controlling the expression projected on the mask 11. The person 10, acting on the expression control signal input device 12, is able to control the expression projected on the mask 11, as he or she moves the hand-driven cart 102.

This modification can be applied to the following play performance. The hand-driven cart 102 is simulated to a linen cart carrying a linen, such as pillow cover or sheets, and an actress playing the part of a motel maid thrusts the cart. The expression of the face projected on the mask 11 worn on the head of the actor is changed with the elocution, contents of the story, and with the dialog with the spectator.

The image projection apparatus of the above-described embodiment projects an image of the face of the moving image on a physical mask worn by the user who is an actor. As the mask 11 is moved in a pre-set area, such as a stage, the position and the direction of the mask 11 is detected by the camera 1, while the projected image is also moved with the mask 11. If the attitude, such as the orientation, of the mask 11 is changed, the projected image is changed with the viewing point of the spectator as a reference. The lip of the face projected on the mask 11 is automatically synchronized with the user speech in real-time. The user is also able to control the expression of the face.

In the present embodiment, infra-red LEDs are used, as an example, as the markers. The present invention, however, is not limited to this configuration. For example, physical markers, such as IR paint or magnetic materials, can also be utilized as the markers.

In the above-described calibration operations, the position of the mask 11 symmetrical with respect to the camera 1 and the projector 2 is adjusted. The present invention, however, is not limited to this configuration. For example, it is possible to control the positions of at last two or all of the camera, projector 1 and the mask 11.

According to the present invention, as described above, an image can be projected on a moving curved surface, so that, by projecting expressions of a face of a moving picture on a mask worn by an actor, there may be provided a new method for performing a story. That is, by controlling the expressions of a face projected on a mask worn by an actor to desired ones, the actor and the image projected on the mask may be adapted to each other in relation to the spectator.

Although the present invention has been described with reference to specific embodiments, those of skill in the art will recognize that changes may be made thereto without departing from the spirit and scope of the invention as set forth in the hereafter appended claims.

We claim:

1. An image projection apparatus for projecting an image on a moving three-dimensional curved surface, comprising:
   a position detection portion for detecting a position of the curved surface;
   a projection portion for projecting an image on the curved surface; and
   a control portion for performing control to create an image to be projected on the curved surface to project the created image by the projection portion on the curved surface based on the position of the curved surface as detected by the position detection portion; wherein
   said position includes the curved surface's x and y position and also the curved surface's attitude.

2. An image projection apparatus for projecting an image on a moving three-dimensional curved surface as claimed in claim 1, wherein the control portion performs initialization so that a two-dimensional pattern projected by the projection portion will be coincident with a pattern of the three-dimensional curved surface.

3. An image projection apparatus for projecting an image on a moving three-dimensional curved surface as claimed in claim 2, wherein the control portion performs initialization so that the two-dimensional pattern projected by the projection portion will be coincident with at least four points arranged as a pattern on the curved surface.

4. An image projection apparatus for projecting an image on a moving three-dimensional curved surface as claimed in claim 3, wherein the at least four points arranged as the pattern on the curved surface are points of a light emitting material.

5. An image projection apparatus for projecting an image on a moving three-dimensional curved surface as claimed in claim 1, wherein the control portion predicts the position of the moving curved surface as detected by the position detection portion to generate an image associated with the predicted positions.

6. An image projection apparatus for projecting an image on a moving three-dimensional curved surface as claimed in claim 1, wherein the image created by the control portion is expressions of a human being.

7. An image projection apparatus for projecting an image on a moving three-dimensional curved surface as claimed in claim 6, further comprising:
   an inputting portion for inputting the control signal controlling the expressions of the human being created by the control portion.

8. A method for projecting an image on a moving three-dimensional curved surface, the method comprising the steps of:
   detecting a position of the curved surface;
   preparing an image to be projected on the curved surface; and
   projecting the prepared image on the curved surface based on the position of the detected curved surface; wherein
   said position includes the curved surface's x and y position and also the curved surface's attitude.

9. A method for projecting an image on a moving three-dimensional curved surface as claimed in claim 8, wherein the position of the detected moving curved surface is predicted and an image corresponding to the predicted position is generated.

10. A method for projecting an image on a moving three-dimensional curved surface as claimed in claim 8, wherein at least one of an attitude and the position of the curved surface is predicted, using a Kalman filter, based on the position of the detected moving curved surface.

11. A method for projecting an image on a moving three-dimensional curved surface as claimed in claim 8, wherein the created image is expressions of a human being.

12. An image projection control apparatus for controlling a projection of an image for a moving three-dimension curved surface, comprising a controller wherein control is performed such that an image to be projected on the curved surface is created based on a position of the inputted curved surface and such that the created image is projected on the curved surface; wherein
   said position includes the curved surface's x and y position and also the curved surface's attitude.

13. An image projection control apparatus for controlling a projection of an image for a moving three-dimensional curved surface as claimed in claim 12, wherein the position of the curved surface is predicted based on the position of the inputted curved surface to create the image corresponding to the predicted position.

14. An image projection control apparatus for controlling a projection of an image for a moving three-dimensional curved surface as claimed in claim 12, wherein the image to be created is expressions of a human being.

* * * * *